(12) United States Patent
Yu et al.

(10) Patent No.: US 11,829,675 B2
(45) Date of Patent: Nov. 28, 2023

(54) SYSTEMS AND METHODS FOR DISCOVERING PRINTERS USING BLUETOOTH LOW ENERGY PROTOCOL

(71) Applicant: CSR IMAGING US, LP, Wilmington, DE (US)

(72) Inventors: Shenbo Yu, Andover, MA (US); Danial Nawaz, Woburn, MA (US); Mark Goldwater, Lowell, MA (US); Taruna Agrawal, Waltham, MA (US)

(73) Assignee: CSR IMAGING US, LP, Wilmington, DE (US)

( * ) Notice: Subject to any disclaimer, the term of this patent is extended or adjusted under 35 U.S.C. 154(b) by 0 days.

(21) Appl. No.: 16/888,010

(22) Filed: May 29, 2020

(65) Prior Publication Data

US 2021/0373831 A1 Dec. 2, 2021

(51) Int. Cl.
*G06F 3/12* (2006.01)
*H04W 4/80* (2018.01)
*H04W 8/00* (2009.01)

(52) U.S. Cl.
CPC .......... *G06F 3/1292* (2013.01); *G06F 3/1232* (2013.01); *G06F 3/1285* (2013.01); *H04W 4/80* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 10,592,183 B1* | 3/2020 | B | G06F 3/1226 |
| 2017/0085694 A1* | 3/2017 | Shibao | H04W 8/005 |
| 2018/0020406 A1 | 1/2018 | Ogawa et al. | |
| 2018/0060005 A1* | 3/2018 | Ueno | H04N 1/00347 |
| 2018/0101342 A1* | 4/2018 | Riveiro | G06F 3/1203 |
| 2019/0246257 A1* | 8/2019 | Hasegawa | H04W 4/80 |

OTHER PUBLICATIONS

International Search Report and Written Opinion—PCT/US2021/025709—ISA/EPO—dated May 28, 2021 13 pages.

* cited by examiner

*Primary Examiner* — Andrew H Lam
(74) *Attorney, Agent, or Firm* — The Marbury Law Group

(57) ABSTRACT

Systems, methods and devices enable wireless discovery of printer devices in proximity to a wireless communication device. A wireless device may detect a mobile print service triggered on the wireless communication device, scan radio channels associated with Bluetooth Low Energy (BLE) advertisement broadcasts, receive BLE advertising packets from printer devices, and display a list of discovered printer devices and printer capabilities based on the received BLE advertising packets. A wireless device may further detect a user input selecting a printer device from the list, establish a BLE connection with the selected printer device, receive information over the BLE connection identifying a wireless local area network (WLAN) or a wireless direct communication link to which the selected printer device is connected, wherein the information is received with the selected printer device, and send a print job to the selected printer device over the identified WLAN or a wireless direct communication link.

22 Claims, 8 Drawing Sheets

SYSTEMS AND METHODS FOR DISCOVERING PRINTERS USING BLUETOOTH LOW ENERGY PROTOCOL

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, smartphones, tablets, etc.) have become smaller, more powerful and more feature-rich than ever. Many of these devices now have impressive processing capabilities, cameras, large memories, and radios/circuitry for wirelessly sending and receiving information.

In conjunction with the expansion of wireless device capabilities, different printing protocols for communication between client devices and printers or print servers have been expanded and developed. Such protocols allow clients to submit print jobs and perform tasks such as querying the status of a printer. For example, the Internet Printing Protocol (IPP) is the default printing protocol in Android and iOS. Further, a number of mobile print protocols exist that enable wireless devices to use printers implementing common printing protocols (e.g., IPP) relatively seamlessly (e.g., AirPrint® and Mopria® Alliance).

Wireless communication technologies have also improved over the past several years. Short-range wireless technologies, such as Bluetooth® and wireless local area network (WLAN) access protocols (e.g., Wi-Fi®), enable high speed communications between mobile electronic devices and computing devices, including printer devices, that are within a relatively short distance of one another (e.g., less than 100 meters for Bluetooth®, etc.). Such wireless communications introduce a host of efficient printer discovery capabilities.

SUMMARY

Systems, methods, and devices of various aspects enable printer devices in proximity to a wireless communication device to be discovered through wireless communications. Various aspects may include detecting a mobile print service triggered on the wireless communication device, scanning radio channels associated with Bluetooth Low Energy (BLE) advertisement broadcasts, receiving BLE advertising packets from printer devices within range of the wireless communication device, and displaying a list of discovered printer devices based on the received BLE advertising packets. In some aspects, the received BLE advertising packets include information regarding printer capabilities, and displaying a list of discovered printer devices based on the received BLE advertising packets may include displaying the list of discovered printer devices and at least one printing capability.

Some aspects may include detecting a user input selecting a printer device from the list of discovered printer devices, establishing a BLE connection with the selected printer device. Embodiment methods may also include receiving information identifying a wireless local area network (WLAN) to which the selected printer device is connected. In some embodiments, the information may be received over the BLE connection with the selected printer device.

Some aspects may include determining whether the wireless communication device is connected to the identified WLAN, performing a handover to the identified WLAN in response to determining that the wireless communication device is not currently connected to the identified WLAN, and sending a print job to the selected printer device over the identified WLAN.

Some aspects may include receiving information from the selected printer device to establish a direct communication link in which the information may be received over the BLE connection, establishing the direct communication link with the selected printer device, and sending a print job to the selected printer device over the established direct communication link.

In some aspects, establishing the direct communication link may include setting up a peer-to-peer connection between the wireless communication device and the selected printer device using a wireless direct communication selected from the group of Wi-Fi Direct, Wi-Fi Aware, LTE Direct, or 5G device-to-device.

In some aspects, the list of discovered printer devices may include, for each discovered printer device, a device name, an internet protocol (IP) address, and an indication of a relative distance of the discovered printer device from the wireless communication device.

Various aspects may include a wireless communication device and/or other end point device, and a processor configured with processor-executable instructions to perform operations of any of the methods summarized above. Various aspects also include a non-transitory processor-readable medium on which are stored processor-executable instructions configured to cause a processor of a wireless communication device to perform operations of any of the methods summarized above. Various aspects also include a wireless communication device having means for performing functions of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
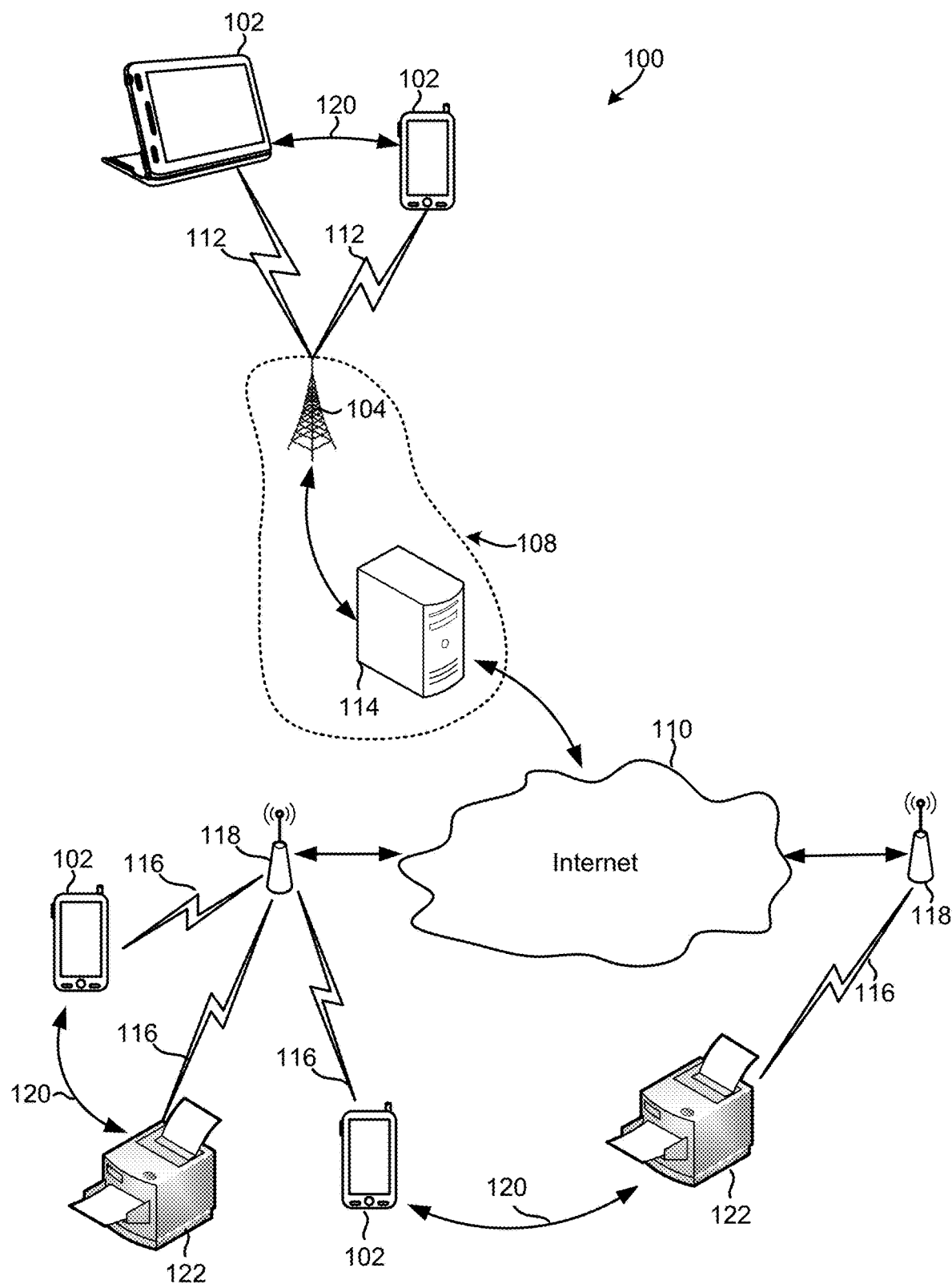
FIG. 1 is a communication system block diagram illustrating network components of an example telecommunication system suitable for use in Various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include methods for improving mobile printing applications on a wireless communication device by enabling discovery of all of the available printers in proximity to the wireless communication device, regardless of each printer's network status or capabilities. Various embodiments enable a wireless computing device to receive advertising packets broadcast by nearby printers using a personal area network (e.g., Bluetooth® Low Energy (BLE)) signal. Such advertising packets include information about the advertising printer that may be displayed to a user of the wireless communication device in order to enable selection of one printer for use through the mobile printing client.

Current mobile print services provide a number of features and enhancements to print functionality on communication devices. For example, the Mopria® Print Service is a plug-in that enables printing from wireless communication devices to supported printers. In particular, a client uses the multicast DNS (mDNS) protocol to automatically discover a printer through a local wireless or wired network to which the printer is connected. Further, the Mopria® Print Service supports printer connection through Wi-Fi Direct. In this manner, Mopria® enables a wireless communication device to print to a supported printer device without requiring any additional set-up Such print technology may be installed on various wireless communication devices (e.g., devices running Android), including those made by Samsung, ZTE, Huawei, and others. Supported printer device include those from more than 25 brands, including from all of the major companies involved in print technology. The Android Default Print Service on Android 8, 9 and 10 phones also feature core print technology from Mopria®.

While mobile print protocols, including Mopria® print service, provide a number of beneficial features, certain limitations in printer discovery and connectivity may still arise. For example, a wireless communication device typically must be in the same wireless network (e.g., WLAN) as a discovered printer in order to connect to it. In a corporate network, a wireless communication device may not be able to discover all of the nearby printers as some may be filtered by information technology (IT) settings. Additionally, even if a printer is discoverable to a wireless communication device, its capabilities and distance from the wireless communication device may be unknown without connecting to the same WLAN as the printer.

Various embodiments address these issues in current mobile print services by providing a comprehensive discovery of the printer devices in the vicinity of a wireless communication device, regardless of the WLAN or other networks to which the printer devices may be connected. In particular, in various embodiments, printers may be configured to use personal area network technologies (e.g., Bluetooth Low Energy (BLE)) to broadcast advertising packets that may be received by a nearby wireless communication device without requiring a Bluetooth or WLAN connection to be established. In various embodiments, the advertisement information may provide details about the broadcasting printer device that enable the user of a wireless communication device to easily select an appropriate printer for the desired print function. Such advertisement information may be utilized to efficiently establish a wireless connection to a discovered printer device if it is selected by the user.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component.

One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

As used herein, the terms "wireless communication device" and "wireless device," may refer to any one or all of cellular telephones, smartphones, watches, wrist displays, personal or mobile multi-media players, personal data assistants (PDA's), tablet computers, laptop computers, netbooks, ultrabooks, palm-top computers, wireless electronic mail receivers, multimedia Internet enabled cellular telephones, wireless gaming controllers, and other similar personal electronic devices that include a programmable processor and circuitry for wirelessly sending and receiving information.

Wireless communication devices include radio frequency (RF) radio or circuitry for wirelessly sending or receiving information via a wireless technology, such as Wi-Fi, and thus may encompass many commercially available devices, medical devices, personal computers, server computers, smart televisions, set-top boxes, cameras, projectors, and other similar electronic devices. Details of the Wi-Fi standards and technologies are set forth in Institute of Electrical and Electronics Engineers' (IEEE) 802.11 standards. While Various embodiments are particularly useful in mobile devices, such as smartphones, the embodiments are generally useful in any wireless-enabled device having communication circuitry for wirelessly sending or receiving information.

As referred to herein, a WLAN connection or link may be synonymous with a connection or group that uses Wi-Fi, Wi-Fi Direct, Wi-Fi Aware, Wi-Fi Display, Miracast, or other WLAN or personal access network (PAN) communication technologies. For the purposes of explanation, the described methods, systems, and devices refer specifically to WLAN; however, other radio communication or access technologies may be compatible with and implemented using the described techniques.

Wireless personal area network technologies take advantage of radio frequencies allocated for low power communications to enable the establishment of short-range wireless networks that can interconnect devices within a small area. Through such interconnections a user can operate a component of a computing and/or communications system without the need for wired connections. Additionally, such interconnections facilitate the ability to connect a first device to a larger area network, including the Internet, by establishing a personal area network between the first device and a second device and connecting the second device to the larger area network.

Several wireless network technologies have been developed and can be used to establish a wireless personal area network. These technologies include, but are not limited to, Bluetooth® technology standards, the ZigBee® specification, Infrared Data Association® (IrD®) specifications, the Wireless USB™ protocol, the Z-Wave® protocol, and Insteon® home automation technology. In particular, Bluetooth® technology standards were developed as a wireless alternative to serial data communication transmission cables, and typically are implemented in a dongle, attachable to a device, or as an integrated circuit within the device. In order to accommodate a wide variety of services, Bluetooth® technologies use targeted specifications, referred to as Bluetooth® profiles, which provide requirements and/or guidelines for particular aspects of Bluetooth®-based communications between devices.

For example, the Generic Access Profile (GAP) defines the method by which two Bluetooth® devices locate each other and establish a wireless connection. The Service Discovery Application Profile (SDAP) governs the use of service discovery profiles to detect devices in a wireless network. The Attribute Profile (ATT) and the Generic Attribute Profile (GATT) define methods of organizing data according to their characteristics and the services supported by the data.

In particular, a Bluetooth® Low Energy (BLE) function enables a communication device to provide information to other BLE functioning devices through advertising packets. Bi-directional communication with such other BLE functioning devices is enabled using GATT.

In various embodiments, printer devices may be configured to broadcast advertising packets over a low-energy personal area network communication link (e.g., BLE) to alert nearby wireless communication devices of its presence. Such advertising packets, also referred to herein as a "BLE advertisement," may include information regarding the printer's location, capabilities, and network status. For example, a BLE advertisement may include identification information, such as an internet protocol (IP) address, a media access control (MAC) address, etc. The BLE advertisement may also include a printer's capabilities, such as whether it supports color printing, two-sided printing, the type and/or size of paper currently loaded in the printer, etc. The BLE advertisement may also include information for establishing a bidirectional connection with the printer, such as a Bluetooth identifier, identification of a WLAN to which the printer is connected, Wi-Fi Direct connection information if supported, etc. The BLE advertisement may also include status information for the printer, such as any toner issues or errors. The BLE advertisement may also include a flag indicating a feature of the printer, such as whether the image forming apparatus requires user authentication.

To discover printers according to various embodiments, the wireless communication device may perform a scanning procedure (e.g., BLE scan) to receive undirected broadcasting data from advertising devices (e.g., printers) located nearby. Based on the received BLE advertisements, the wireless communication device may compile a list of discovered printers and corresponding printer capabilities and characteristics, which may be displayed to the user, such as in the form of a list, which may include a printer device name, printer capabilities, and an IP address. In some embodiments, the displayed information may include a relative proximity of each of the discovered printers based on properties of the received advertising packets, such as the signal strength.

In response to receiving a user input selecting one of the discovered printers (e.g., detecting a user touch of a printer name displayed on a touch-sensitive display), the wireless communication device may automatically connect to the selected printer by using the information received in the BLE advertisement. Alternatively, the wireless communication device may transmit a request for a communication link to the selected printer, such as a BLE communication link. In some embodiments, such request may be sent based on information received in the BLE advertisement, such as the Bluetooth ID.

Upon establishing a bi-directional BLE connection with the selected printer, the wireless communication device and the selected printer may exchange further information to establish a connection over a wireless network. For example, if the selected printer supports a direct wireless communication link protocol, the wireless communication device and printer may exchange pairing information to form a secure wireless connection (e.g., using Wi-Fi Protected Setup/Wi-Fi Protected Access (WPA)).

The direct wireless communication links may be setup using a variety of different device-to-device (e.g., peer-to-peer) wireless protocols, including, but not limited to, Wi-Fi Direct, LTE Direct, Wi-Fi neighbor awareness network (NAN) or Wi-Fi Aware, 5G device-to-device, etc. For example, Wi-Fi Direct enables communication of large amount of data (e.g., image files, Microsoft office files, PDF files, etc.), and operates via Wi-Fi communication links.

If the selected printer does not support a direct device-to-device wireless communication protocol, the wireless communication device may receive information over the BLE connection identifying the WLAN to which the selected printer is connected. Based on the received WLAN information, the wireless communication device may perform an automatic handover to the WLAN of the selected printer. In this manner, the wireless communication device may connect to the selected printer via the WLAN, and use that network connection to send the selected print job to the selected printer.

Various embodiments may make use of a variety of communication systems to enable wireless devices to discover printer devices and receive relevant connection information provided from the initial discovery process, examples of which are illustrated in FIG. 1. A communication system 100 may include a plurality of wireless communication devices 102, which may be configured to communicate via BLE links, a cellular telephone network, a radio access network, Wi-Fi network, WiMAX network, and/or other well-known technologies.

The communication system 100 illustrated in FIG. 1 may include a wireless telecommunications network 108 (e.g., a cellular network), which typically includes a plurality of base stations 104 (e.g., base transceiver station) coupled to a network operations center operable to communicate the voice, data, and control signals between wireless devices 102 and to other network destinations. Communications between the wireless communication devices 102 and the wireless telecommunications network 108 may be accomplished via two-way wireless communication links 112, such as 4G, 3G, CDMA, TDMA, and other cellular telephone communication technologies. The telecommunications network 108 may also include one or more servers 114 that provide a connection to the Internet 110.

The wireless devices 102 may be, for example, a smartphone, a tablet computer, a cellular telephone, or any other suitable end point device capable of rendering media content. In general, the wireless devices 102 may include a platform that can receive and execute software applications, data and/or commands transmitted over the wireless network that may ultimately come from the server 114, the Internet 110 and/or other remote servers and networks.

The wireless communication devices 102 may also be connected to the Internet 110 through wireless communication links 116 to a wireless access point 118. The wireless communication devices 102 may establish direct peer-to-peer connections 120 to one another and/or to via short-range wireless technologies, such as Wi-Fi. The direct peer-to-peer connections 120 may be established directly between the wireless communication devices 102 without any intervening network components or devices by using Wi-Fi Direct, Wi-Fi P2P, Tunneled Direct Link Setup (TDLS), and/or other protocols. Any of a number of printers 122 may also be connected to the Internet 110 through wireless communication links 116 to a wireless access point 118, which may be the same or different from the wireless access point 118 to which the wireless communication devices are connected. The wireless communication devices 102 may establish direct peer-to-peer connections 120 to one or more printers 122. In some embodiments, the capability of the printer 122 to connect to a wireless access point 118 may be provided by a wireless access card connected via a wired connection to the printer 122.

Figure 2:
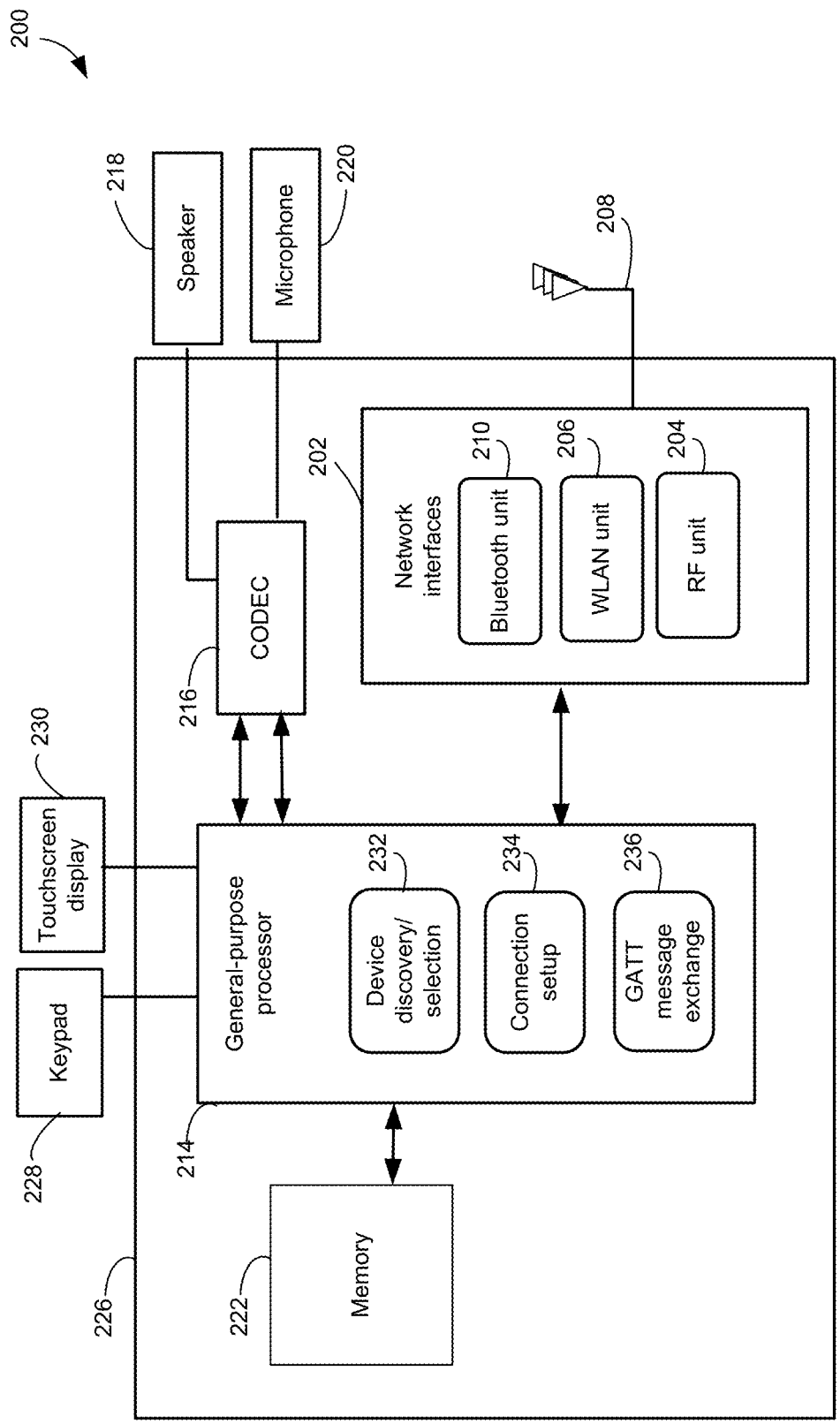
FIG. 2 is a block diagram illustrating a wireless communication device according to various embodiments.

FIG. 2 is a functional block diagram of an example wireless communication device 200 that is suitable for implementing various embodiments. The wireless device 200 may be similar to one or more of the wireless devices 102 described with reference to FIG. 1.

With reference to FIGS. 1-2, the wireless communication device 200 may be, for example, a cellular telephone, a personal digital assistant (PDA), a smartphone, a tablet, a wristband, an ankle band, a ring, a watch, a pendant, a belt, or any other type of portable or wearable device.

The wireless communication device 200 may include at least one subscriber identity module (SIM) interface, which may receive at least one SIM that is associated with at least a first subscription. Each SIM in various embodiments may contain user account information, an international mobile subscriber identity (IMSI), a set of SIM application toolkit (SAT) commands, and storage space for phone book contacts. The SIM(s) may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on the SIM(s) 204 for identification.

The wireless communication device 200 may include network interfaces 202, which may be configured to establish data links for communicating over various networks. For example, the network interfaces 202 may include one or more RF unit 204. As used herein, the term "RF unit" refers to the components in a communication device that send, receive, and decode radio frequency signals. An RF unit may include a number of components coupled together that transmit RF signals that are referred to as a "transmit chain," and a number of components coupled together that receive and process RF signals that are referred to as a "receive chain." For example, the at least one RF unit 204 may be coupled to the SIM interface(s) and to one or more antenna 208, and may be configured to enable communications using at least one mobile carrier's radio access technology (e.g., GSM, HSPA, CDMA, EVDO, LTE, etc.). The RF unit 204 may include or provide connections to different sets of amplifiers, digital to analog converters, analog to digital converters, filters, voltage controlled oscillators, etc.

The network interfaces 202 may further include at least one WLAN unit 206. The WLAN unit 206 may be a wireless network interface controller coupled to at least one antenna 208. The WLAN unit 206 may allow the wireless communication device 200 to connect to a wireless access point or another device using IEEE 802.11 or similar standards for RF channels.

The network interfaces 202 may further include at least one Bluetooth unit 210, which supports connections via Bluetooth protocols. The Bluetooth unit 210 may allow the wireless communication device 200 to send communications to and/or receive communications from another device using a Bluetooth protocol (e.g., BLE). Other network interfaces 202 may be included, including those that support connections via near field communication (NFC) protocols, infrared (IR) beam protocols, and/or other long-range or short-range technologies.

In various embodiments, the wireless communication device 200 may include a general-purpose processor 214, which may be a processing unit, application specific integrated circuit (ASIC), a field programmable gate array (FPGA), or other electronic circuitry for performing computations. The general-purpose processor 214 may be coupled to a coder/decoder (CODEC) 216. The CODEC 216 may in turn be coupled to a speaker 218 and a microphone 220. The general-purpose processor 214 may also be coupled to a memory 222 such as non-transitory computer readable storage medium.

The memory 222 may store executable instructions to configure the general-purpose processor 214 to implement the processes as described. Further, the memory 222 may store data related to re-initiating peer-to-peer communications, such as credentials and identifiers.

In some embodiments, the general-purpose processor 214, the CODEC 216, the memory 222, and the network interfaces 202 may be included in a system-on-chip device 226. The antennas 208, as well as various input and output devices may be coupled to components of the system-on-chip device 226, such as interfaces or controllers. Example user input components suitable for use in the wireless communication device 200 may include, but are not limited to, a keypad 228 and a touchscreen display 230. In some embodiments, the touchscreen display 230 may implement a graphical user interface (GUI) that presents visual information to a user of the wireless communication device 200.

The various functions of the general-purpose processor 214 may be implemented in multiple corresponding components, modules and/or engines of the general-purpose processor 214. In various embodiments, one or more modules and/or engines may support a mobile print control application (e.g., Mopria®, AirPrint®, etc.) on the wireless communication device 200. The mobile print application may be capable of generating data for printing, and transmitting the generated data to the printer through a communication link. The data generated may be compliant with a printing standard with general purpose rasterizing process.

Modules and/or engines that support the mobile print control application may include, for example, a device discovery component 232, which may be configured to perform various operations for discovering external devices (e.g., printers) that are within the communication range of the wireless communication device 200. Such operations may involve activating a network interface 202, such as the Bluetooth unit 210. The device discovery component 232 operations may include performing a scanning procedure that involves listening to the BLE advertisement channels set forth by the Bluetooth specification (e.g., channels 37, 38, and 39) to receive advertising packets for discovering nearby printers. In some embodiments, the scanning procedure may further include sending a scan request message to an external device (e.g., printer), and to receive a scan response message from the external device, in order to receive advertisement data beyond that which can fit into one advertising packet. The device discovery operations 232 may also include discovering service capabilities and determining network information for one or more discovered external devices (e.g., printers) based on the received BLE advertisement (e.g., advertising packet and/or scan response message).

The operations of the device discovery component 232 may involve activating the WLAN unit 210 within the network interface 202. The WLAN unit 210 may include a Wi-Fi radio or transceiver. Device discovery/selection operations may further include broadcasting a discovery signal (e.g., a probe request message) from the WLAN unit, and/or detecting discovery signals broadcast by the other wireless devices that are in communication range of the wireless communication device 200. The device discovery and selection operations may also include discovering the service capabilities of the identified external devices and/or to determine whether a communication link may be established with one or more of the identified external devices. In various embodiments, such determination may be accomplished via Wi-Fi, TDLS, and/or Wi-Fi Direct protocols.

A connection setup component 234 may be configured to establish and manage one or more connections that enables communication to a selected external device (e.g., printer). Such one or more connections may utilize technologies such as BLE, WLAN connectivity Wi-Fi Direct, and/or any others that enable the exchange of data between the wireless communication device and a selected external device (e.g., printer). In particular, connection setup operations may include extracting identification information from a BLE advertisement received from the printer, and establishing a bi-directional connection with the printer. For example, the connection setup component 234 may transmit to a selected printer connection request packets that carry parameters including frequency hopping sequence, connection interval, connection timeout, etc.

A Generic Attribute Profile (GATT) message exchange component 236 may be configured in order to exchange profile and user data over a BLE connection with an external device (e.g., a printer). GATT uses the Attribute Protocol (ATT) as its transport protocol to exchange data, which may be organized into various services. In order to perform BLE communication with the selected printer, the wireless communication device 200 may transit a connection request to a selected printer to change to GATT communication. The GATT communication realizes bidirectional communication between the wireless communication device 200 and a printer. Once a BLE GATT connection is established between the wireless communication device and the selected printer, data packets may be exchanged at regular connection events.

Figure 3:
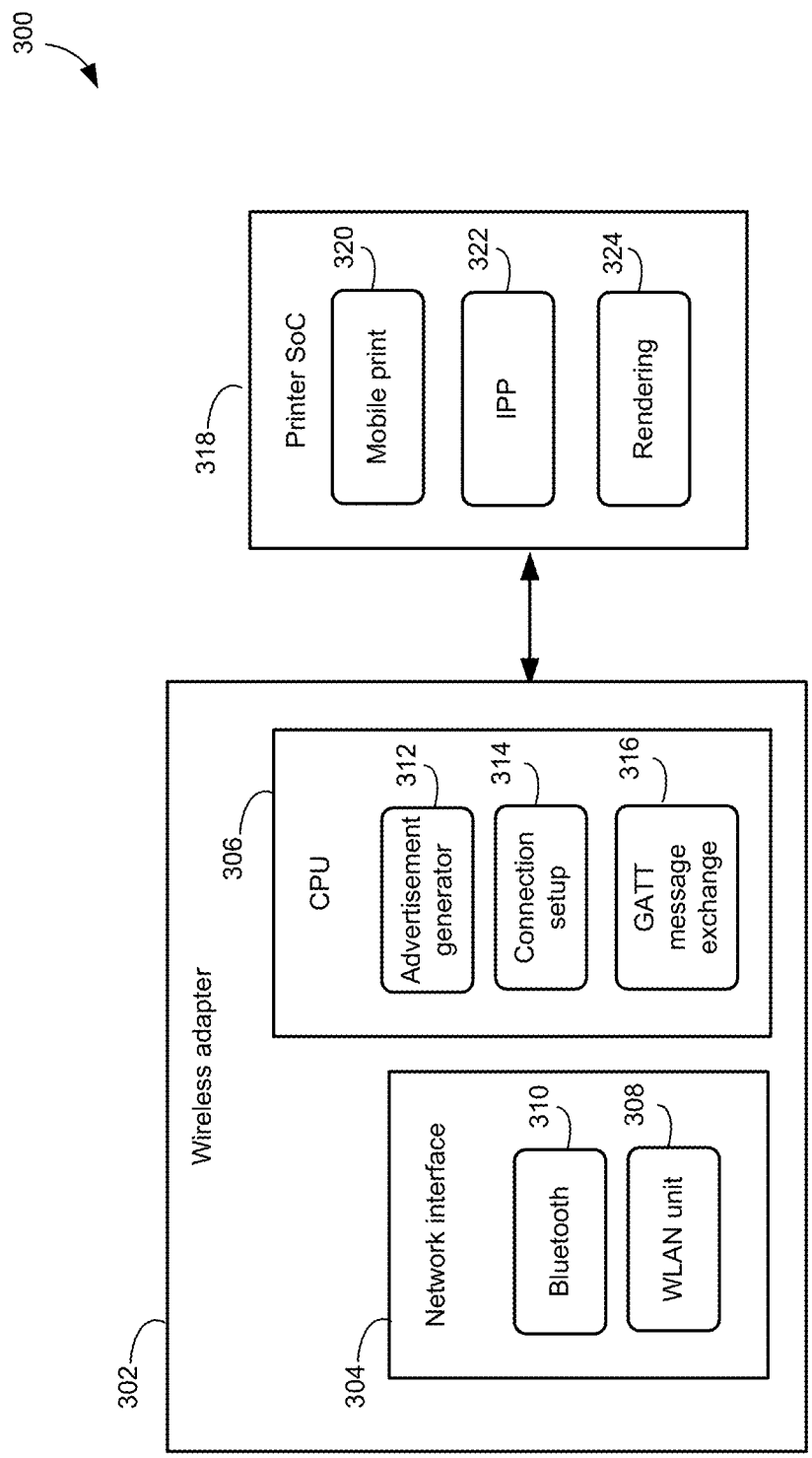
FIG. 3 is a block diagram illustrating a printer device according to various embodiments.

FIG. 3 is a functional block diagram of an example printer device 300 that is suitable for implementing various embodiments. With reference to FIGS. 1-3, the printer device 300 may be similar to one or more of the printers 122 described with reference to FIG. 1.

In various embodiments, the printer device 300 may be a computing device that includes both printing and communication capabilities, such as through BLE and WLAN protocols. The printer device 300 may be embodied in separate hardware, or as an IPS-based virtual printer running on a general computing device.

The printer device 300 may include a wireless adapter component 302 that includes network interfaces 304 and a central processing unit (CPU) 306. In some embodiments, the wireless adaptor component 302 may be, for example, a single-chip device, such as wireless local area network (WLAN) modem. In various embodiments, the network interfaces 304 of the wireless adaptor component 302 may include a WLAN unit 308 and a Bluetooth unit 310.

The CPU 306 of the wireless adaptor component 302 may include an advertisement generator module 312, which may be used to generate BLE advertisements for broadcast while the printer device 300 is in advertising mode. Such BLE advertisements, which are broadcast using the Bluetooth unit 310, may be advertising packets transmitted on the primary advertising channels (e.g., 37, 38, and 39), and optionally advertising packets transmitted on secondary advertisement channels.

The advertising packets generated by the advertisement generator module 312 may include information such as local identifiers (e.g., an IP address, MAC address, and/or local name for the printer device 300), a list of service universally unique identifiers (UUIDs) corresponding to the services provided by the printer device 300, data associated with the service UUIDs, a local name for the printer device 300, a flag indicating that the printer device 300 is connectable, the transmit power level, the connection interval range for advertising packets, and the advertising interval.

Further, the advertisement generator module 312 may be utilized to generate scan response packets in response to a scan request messages received while in advertising mode. Such scan response packets may provide to the requesting device additional advertising data.

A connection setup component 314 may be configured to establish and manage one or more connections that enables communication with the wireless communication device 200. Such one or more connections may utilize technologies such as BLE, WLAN connectivity Wi-Fi Direct, and/or any others that enable the exchange of data. In particular, connection setup operations may include receiving connection request packets from the wireless communication device 200, and negotiating a bi-directional connection with the device.

The CPU 306 may also include a GATT message exchange component 316, which may be configured to enable the exchange of information with the wireless communication device over an established BLE connection. For example, data packets including information about a WLAN connection or direct communication protocol utilized by the printer device 300 may be sent to the wireless communication device using the BLE connection.

The printer device 300 may also include a SoC 318, which may be connected to the wireless adaptor component 302 through one or more wired link (e.g., a universal asynchronous receiver-transmitter (UART) and/or a USB). In various embodiments, the SoC 318 of the printer device 302 may include a mobile print module 320. The mobile print module 320 may provide information that is used by the advertisement generator module 308 to create BLE advertisements. Such information may include, for example, services and service data associated with the printer device 300, as well as local identifiers. Further, the mobile print module may provide information that is used by the advertisement generator module 308 to create scan response messages that include additional advertisement data. Further, the mobile print module 320 may include a GATT service profile for the printer device 300.

The SoC 318 may also include an IPP module 322, which may enable receiving print jobs from client devices (e.g., the wireless communication device 200). The print job may involve executing print processing on a sheet based on print data received from the wireless communication device 200 using the WLAN unit 308.

The SoC 318 may also include a rendering module 324, which may convert content of a print job received from a client (e.g., wireless communication device) into data that may be read and executed by the printer device 300.

The modules of the SoC 308 may be implemented by a processor (e.g., CPU, microcontroller, etc.), and may involve accessing programs stored in a memory of the printer device 300 (not shown).

Figure 4A:
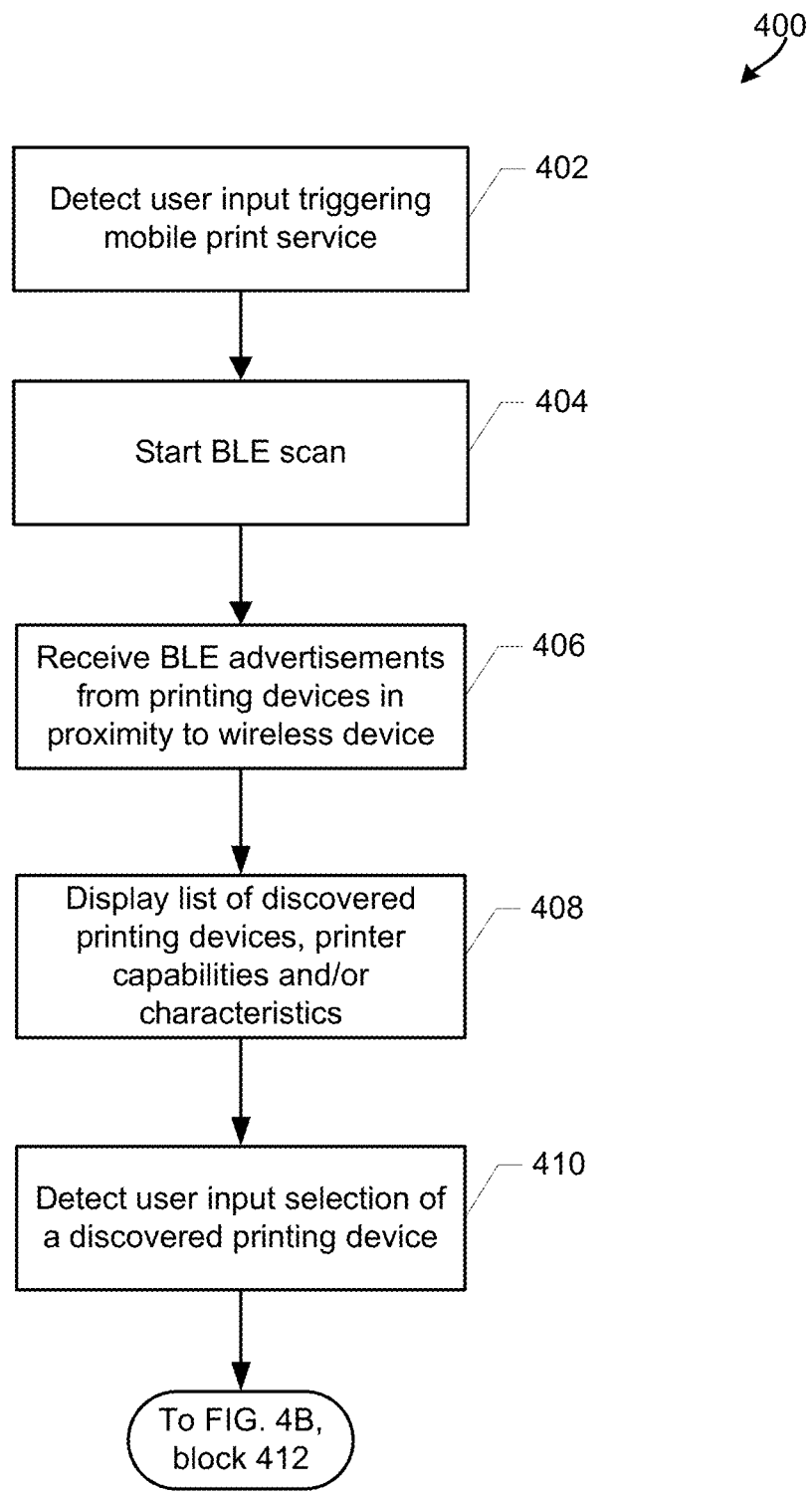
FIGS. 4A and 4B are process flow diagrams illustrating an embodiment method for discovering printer devices through Bluetooth Low Energy (BLE) advertisement according to various embodiments.
Figure 4B:
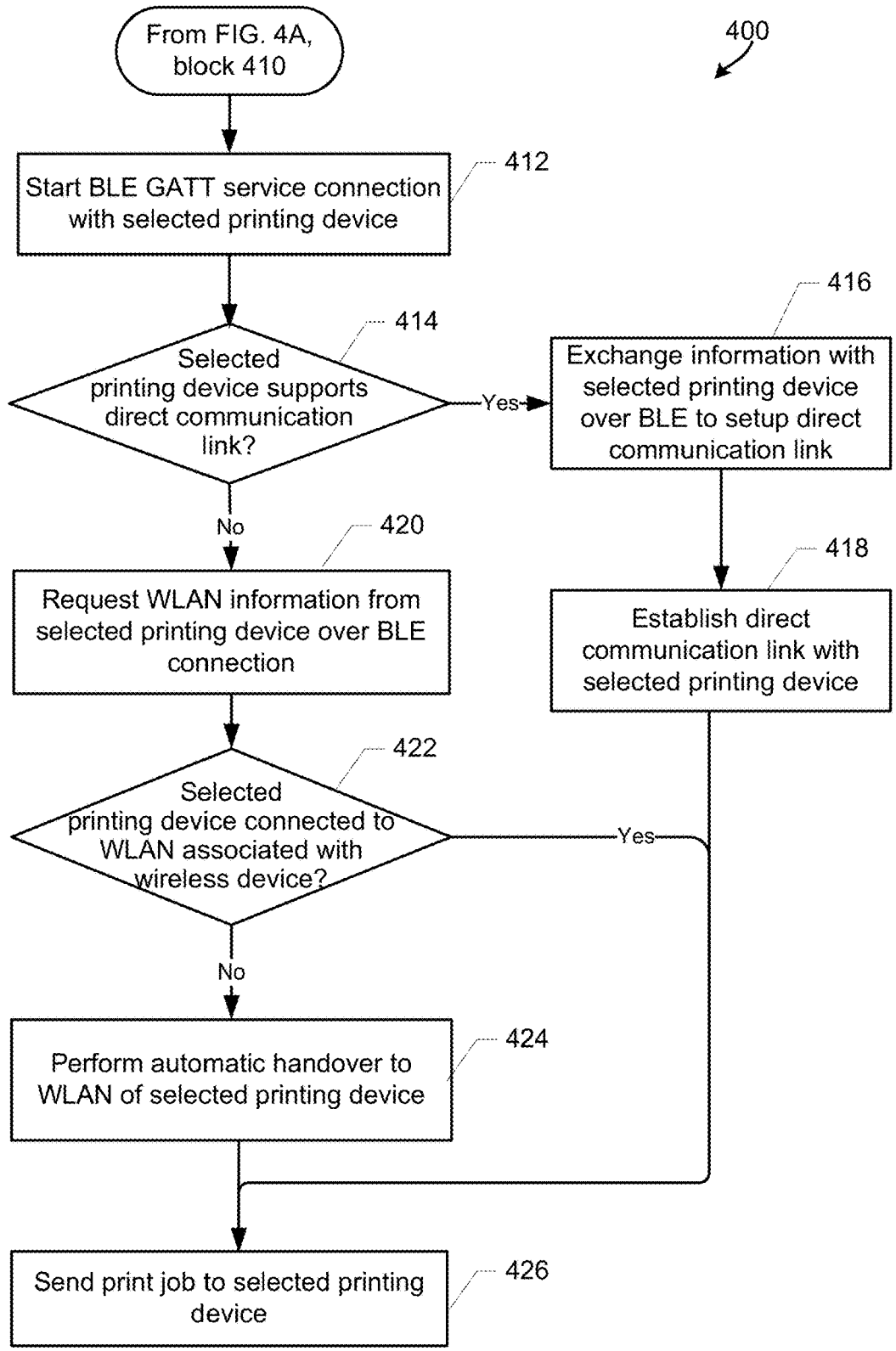

FIGS. 4A-4B illustrate a method 400 of implementing BLE printer discovery on a wireless communication device according to various embodiments. With reference to FIGS. 1-4B, the operations of the method 400 may be implemented by one or more processors of a wireless device, such as the wireless communication device 200. The one or more processors may include, for example, the general purpose processor(s) 214, or a separate controller (not shown) that may be coupled to the memory 222 and to the general purpose processor(s) 214.

While the descriptions of various embodiments address discovering and selecting printer devices by one wireless communication device located in a particular area, the various embodiment processes may be implemented by multiple wireless communication devices for multiple print jobs in a variety of locations. While the particular discovered printers (e.g., printer device 300) and capabilities associated with the printers may vary depending on the location of the wireless communication device, a general algorithm for implementing a discovery and selection utility may proceed according to method 400.

In block 402, the wireless device processor may detect a user input triggering a mobile print service. Such a user input may be, for example, performed through an interface presented by an application associated with the creation of files and/or data that may be printed (e.g., a word processing application, an image gallery, etc.). In some embodiments, such applications may present a button or icon on a touch sensitive (e.g., touchscreen) display of the wireless communication device, which may be touched by a user to trigger the service.

In block 404, the wireless device processor may start a BLE scan to detect printer devices (e.g., printer device(s) 300) within its vicinity that are configured with BLE advertisement capability. Specifically, the BLE scan may involve monitoring BLE advertising channels (e.g., channels 37, 38, and 39) for advertising packets broadcast by one or more printer device.

In block 406, the wireless device processor may receive BLE advertisements from capable printer devices in proximity to the wireless device. In some embodiments, receiving BLE advertisements may also include requesting additional information from a detected printer device by sending a scar request message, and receiving a scan response packet from the detected printer device on the same advertising channels. Received BLE advertisements may include a printer device name, printer capability information, and an IP address of the printer device.

In block 408, the wireless device processor may display a list of discovered printer devices, which may include printer capabilities and associated characteristics. Such list of printer devices may be generated based on the information from the BLE advertisements received by the wireless device. The information included in the displayed list may include, for example, identifications including the printer device name and IP address, printer capabilities (e.g., black & white, color, etc.), service UUIDs, transmit power level, etc. Depending on the characteristics of the printer devices, the wireless device processor may automatically utilize such information to make particular printer devices discoverable (e.g., automatically adding a printer device's IP address). In some embodiments, the wireless device may gather additional information about each discovered printer device based on characteristics of the BLE advertisement (e.g., received signal strength). In various embodiments, the list of discovered printer devices may include a name for each printer device in proximity to the wireless device, its relative distance from the wireless device (e.g., near or far), and its capabilities (e.g., color printing, double-sided printing, etc.).

In block 410, the wireless device processor may detect a user input selecting a printer device from the list of discovered printer devices. The selection may be, for example, through user input to a touchscreen displaying the list of the identified printer devices. For example, a user may touch a particular printer name or identifier displayed on the touchscreen display.

In block 412, the wireless device processor may establish a BLE service connection with the selected printer device. For example, the wireless device may be configured to send to the selected printer device a connection request packet according to the BLE connection establishment procedure. The connection request packet may include all of the required data needed to setup a BLE communication between the wireless device and the selected printer device using the GATT protocol.

In determination block 414, the wireless device processor may determine whether the selected printer device supports a wireless direct communication link, such as using Wi-Fi Direct, Wi-Fi Aware, TDLS, LTE Direct, 5G device-to-device, or other similar technologies. In various embodiments, such a determination may be based on information received from the selected printer device in the BLE advertisement and/or in a scan response packet.

In response to determining that the selected printer device supports a wireless direct communication link (i.e., determination block 414="Yes"), the wireless device processor may exchange information with the selected printer device over the BLE connection to setup the direct communication link in block 416. In block 418, the wireless device processor may setup the direct communication link with the selected printer device. Setting up the direct communication link may involve signaling to exchange control information between the printer device and the wireless device without an access point or server acting as an intermediary.

In response to determining that the selected printer device does not support a wireless direct communication link (i.e., determination block 414="No"), the wireless device processor may request WLAN information from the selected printer device using the BLE connection in block 420. For example, the WLAN information may include an identification of one or more WLAN to which the printer device is currently connected.

In determination block 422, the wireless device processor may determine whether the selected printer device is connected to a WLAN associated with the wireless device. Such determination may be based, for example, on a comparison of the WLAN information received from the printer device using the BLE connection to the current network connections of the wireless device.

In response to determining that the wireless device processor is not connected to a WLAN associated with the wireless device (i.e., determination block 422="No"), the wireless device processor may perform an automatic handover to the WLAN of the selected printer device in block 424. Specifically, such handover may be performed using the WLAN information received from the printer device over the BLE connection.

In response to determining that the wireless device processor is connected to a WLAN associated with the wireless device (i.e., determination block 422="Yes"), or following the operations in block 418 or block 424, the wireless device processor may send a print job associated with the triggered mobile print service to the selected printer device over the identified WLAN in block 426. For example, the wireless device processor may send the print job to the selected printer device using the established direction communication link, or over a connection to the common WLAN of the wireless device and the selected printer device.

Figure 5:
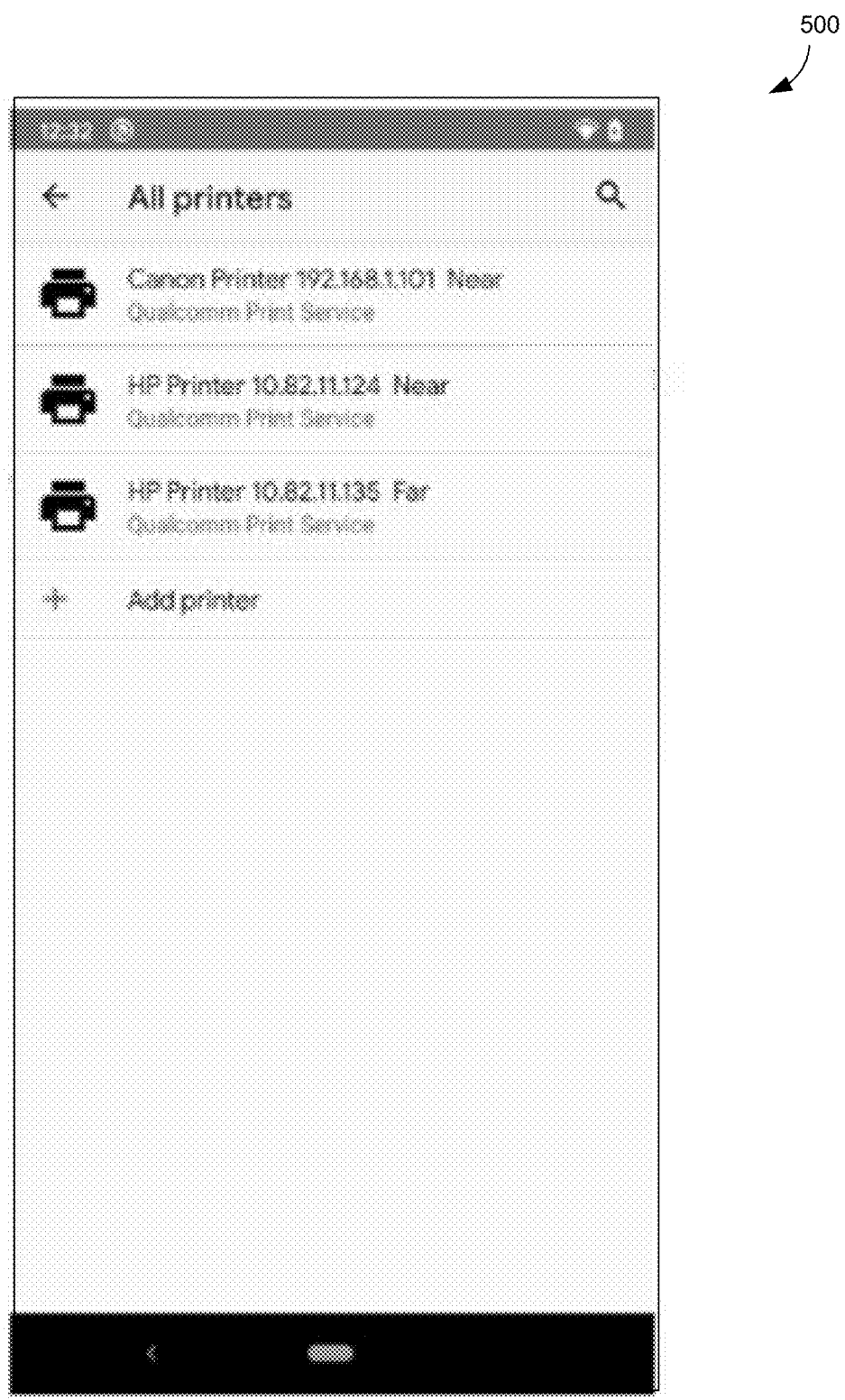
FIG. 5 is an illustration of a screenshot on a touchscreen display of an embodiment list of discovered printer devices provided on a wireless communication device.

FIG. 5 is a screenshot of a touchscreen display 500 illustrating an example interface for a displaying a list of discovered printers on a wireless communication device (e.g., wireless devices 102 and/or 200). With reference to FIGS. 1-5, the list provides an example that may be generated by implementing the BLE printer discovery utility in various embodiments.

The touchscreen display 500 of the wireless device illustrates only one example of how discovered printer devices in proximity to the wireless device may be presented to a user in various embodiments. As shown in the displayed list, three capable printer devices were discovered in the vicinity of the wireless device. Each discovered printer device is identified in the list by a name and its IP address. Further, the list includes, for each discovered printer, an indication of the relative proximity of the printer device to the current location of the wireless device.

The configuration and layout of icons and other graphical elements in touchscreen display 500 are provided merely as example designs, and are not intended to limit the embodiment display interfaces.

Figure 6:
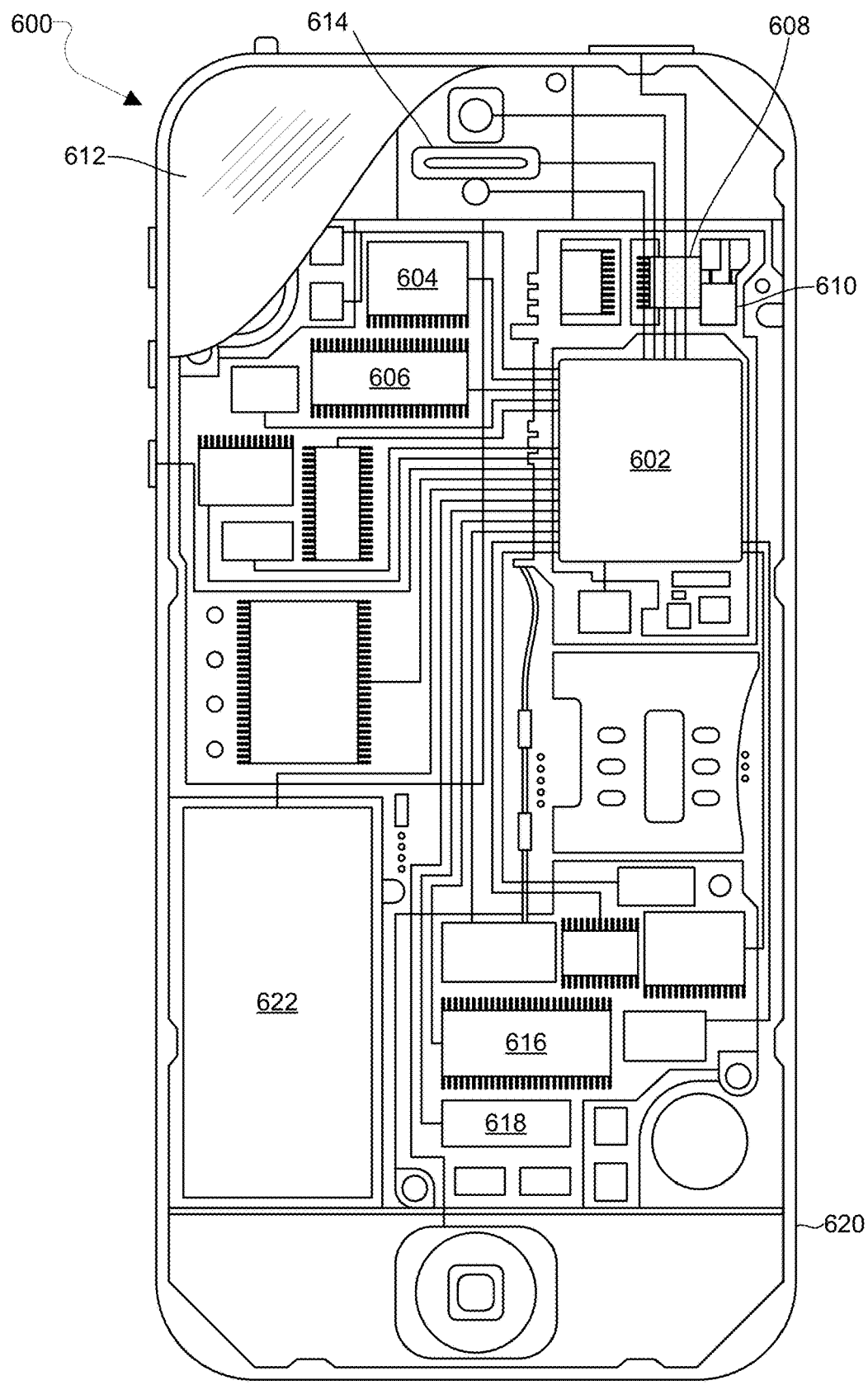
FIG. 6 is a component block diagram of an example wireless communication device suitable for use with various embodiments.

Various examples (including, but not limited to, the examples discussed above with reference to FIGS. 4A-5) may be implemented in any of a variety of wireless devices, an example 600 of which is illustrated in FIG. 6. With reference to FIGS. 1-6, the wireless device 600 (which may correspond, for example, to the wireless devices 102 and/or 200 in FIGS. 1-2) may include a processor 602 coupled to a touchscreen controller 604 and an internal memory 606. The processor 602 may be one or more multicore ICs designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennas 610, for sending and receiving, coupled to each other and/or to the processor 602. The transceivers 608 and antennas 610 may be used with the above-mentioned circuitry to implement the various wireless transmission protocol stacks and interfaces. The wireless device 600 may include a cellular network wireless modem chip 616 that enables communication via a cellular network and is coupled to the processor.

The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

Figure 7:
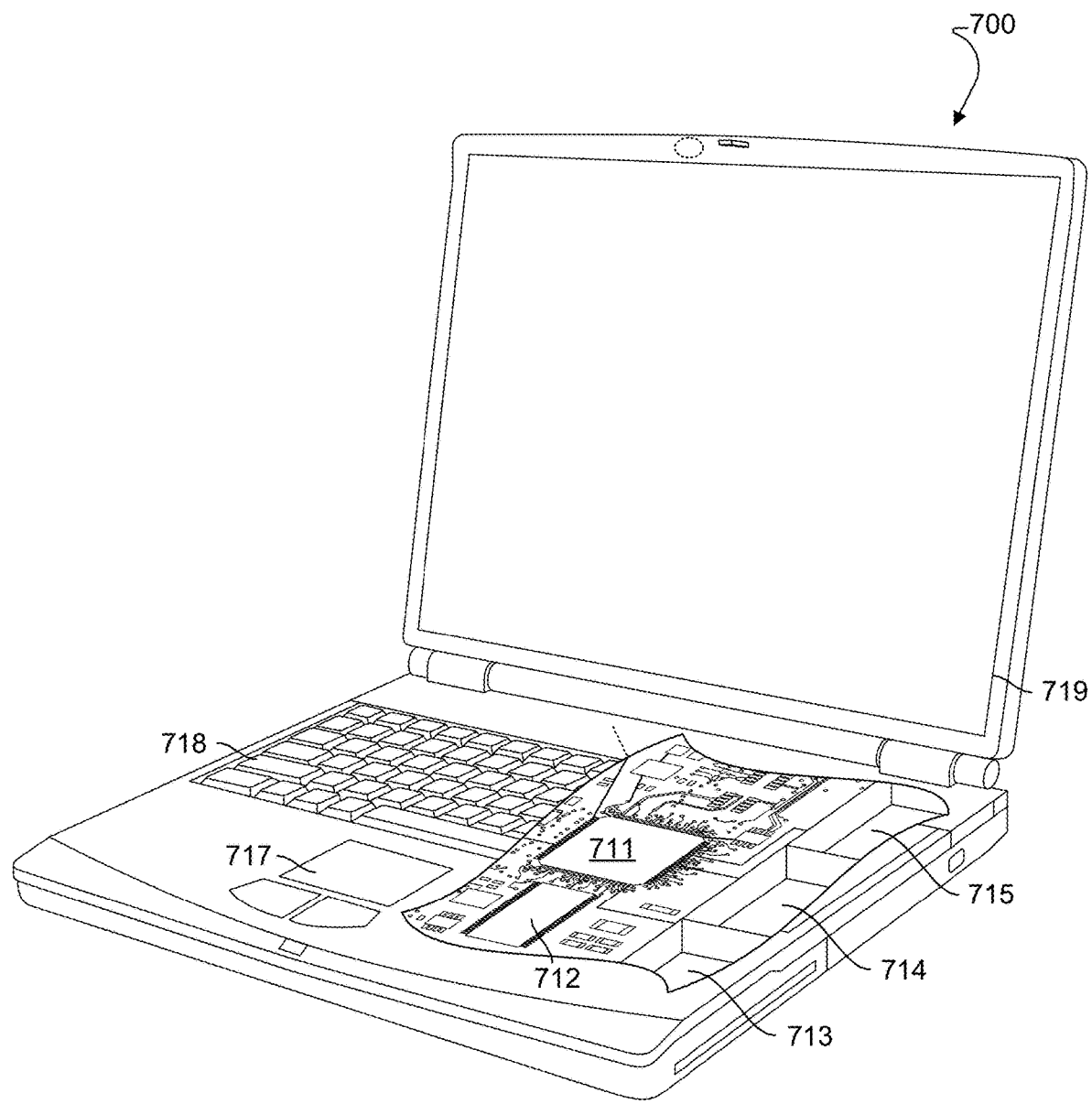
FIG. 7 is a component block diagram of another example wireless communication device suitable for use with various embodiments.

Various examples (including, but not limited to, the examples discussed above with reference to FIGS. 4A-5), may also be implemented within a variety of personal computing devices, an example 700 of which is illustrated in FIG. 7. With reference to FIGS. 1-7, the laptop computer 700 (which may correspond, for example, to the wireless devices 102, 200 in FIGS. 1A-2) may include a touchpad touch surface 717 that serves as the computer's pointing device, and thus may receive drag, scroll, and flick gestures similar to those implemented on wireless computing devices equipped with a touchscreen display and described above. A laptop computer 700 will typically include a processor 711 coupled to volatile memory 712 and a large capacity non-volatile memory, such as a disk drive 713 of Flash memory. The computer 700 may also include a floppy disc drive 714 and a compact disc (CD) drive 715 coupled to the processor 711. The computer 700 may also include a number of connector ports coupled to the processor 711 for establishing data connections or receiving external memory devices, such as a Universal Serial Bus (USB) or FireWire® connector sockets, or other network connection circuits for coupling the processor 711 to a network. In a notebook configuration, the computer housing includes the touchpad 717, the keyboard 718, and the display 719 all coupled to the processor 711. Other configurations of the computing device may include a computer mouse or trackball coupled to the processor (e.g., via a USB input) as are well known, which may also be used in conjunction with various examples.

With reference to FIGS. 1A-7, the processors 602, 711 may be any programmable microprocessor, microcomputer or multiple processor chip or chips that can be configured by software instructions (applications) to perform a variety of functions, including the functions of various examples described above. In some devices, multiple processors may be provided, such as one processor dedicated to wireless communication functions and one processor dedicated to running other applications. Typically, software applications may be stored in the internal memory 606, 712, 713 before they are accessed and loaded into the processors 602, 711. The processors 602, 711 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602, 711, including internal memory or removable memory plugged into the device and memory within the processor 602 and 711, themselves.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various examples to a particular order, sequence, type of network or carrier.

The various illustrative logical blocks, processes, circuits, and algorithm steps described in connection with the examples disclosed herein may be implemented as electronic hardware, computer software, or combinations of both. To clearly illustrate this interchangeability of hardware and software, various illustrative components, blocks, processes, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, processes, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the following claims and the principles and novel features disclosed herein.

What is claimed is:

1. A method of discovering printer devices in proximity to a wireless communication device, the method comprising:
    detecting a mobile print service triggered on the wireless communication device;
    scanning radio channels associated with Bluetooth Low Energy (BLE) advertisement broadcasts to monitor BLE advertising channels;
    receiving BLE advertising packets from printer devices within range of the wireless communication device, the BLE advertising packets including:
        information identifying a printing capability of a printer device and
        information indicating whether the printer device supports a wireless direct communication link;
    requesting and receiving additional information that exceeds a byte capacity of a single BLE advertising packet from one or more of the printer devices within range of the wireless communication device for one or more of the received BLE advertising packets by:
        sending a scan request message to the one or more of the printer devices; and
        receiving a scan response packet from the one or more of the printer devices on one or more of the BLE advertising channels; and displaying at least one printing capability, identified in the received BLE advertising packets or received additional information, as part of a list of discovered printer devices.

2. The method of claim 1, further comprising:
detecting a user input selecting a printer device from the list of discovered printer devices; and
establishing a BLE connection with the selected printer device.

3. The method of claim 2, further comprising:
receiving information identifying a wireless local area network (WLAN) to which the selected printer device is connected, wherein the information is received over the BLE connection with the selected printer device.

4. The method of claim 3, further comprising:
determining whether the wireless communication device is connected to the identified WLAN;
performing a handover to the identified WLAN in response to determining that the wireless communication device is not currently connected to the identified WLAN; and
sending a print job to the selected printer device over the identified WLAN.

5. The method of claim 2, further comprising:
receiving information from the selected printer device to establish a direct communication link, wherein the information is received over the BLE connection;
establishing the direct communication link with the selected printer device;
sending a print job to the selected printer device over the established direct communication link.

6. The method of claim 5, wherein establishing the direct communication link comprises setting up a peer-to-peer connection between the wireless communication device and the selected printer device using a wireless direct communication selected from the group of Wi-Fi Direct, Wi-Fi Aware, LTE Direct, or 5G device-to-device.

7. The method of claim 1, wherein the list of discovered printer devices includes, for each discovered printer device:
a device name, an internet protocol (IP) address, and an indication of a relative distance of the discovered printer device from the wireless communication device.

8. A wireless communication device, comprising:
a memory; and
a processor coupled to the memory and configured with processor-executable instructions to:
detect a mobile print service triggered on the wireless communication device;
scan radio channels associated with Bluetooth Low Energy (BLE) advertisement broadcasts to monitor BLE advertising channels;
receive BLE advertising packets from printer devices within range of the wireless communication device, the BLE advertising packets including:
information identifying a printing capability of a printer device; and
information indicating whether the printer device supports a wireless direct communication link;
request and receive additional information that exceeds a byte capacity of a single one BLE advertising packet from one or more of the printer devices within range of the wireless communication device for one or more of the received BLE advertising packets by:
sending a scan request message to the one or more of the printer devices; and
receiving a scan response packet from the one or more of the printer devices on one or more of the BLE advertising channels; and
display at least one printing capability, identified in the received BLE advertising packets or received additional information, as part of a list of discovered printer devices.

9. The wireless communication device of claim 8, wherein the processor is further configured with processor-executable instructions to:
detect a user input selecting a printer device from the list of discovered printer devices; and
establish a BLE connection with the selected printer device.

10. The wireless communication device of claim 9, wherein the processor is further configured with processor-executable instructions to:
receive information identifying a wireless local area network (WLAN) to which the selected printer device is connected, wherein the information is received over the BLE connection with the selected printer device.

11. The wireless communication device of claim 10, wherein the processor is further configured with processor-executable instructions to:
determine whether the wireless communication device is connected to the identified WLAN;
perform a handover to the identified WLAN in response to determining that the wireless communication device is not currently connected to the identified WLAN; and
send a print job to the selected printer device over the identified WLAN.

12. The wireless communication device of claim 9, wherein the processor is further configured with processor-executable instructions to:
receive information from the selected printer device to establish a direct communication link, wherein the information is received over the BLE connection;
establish the direct communication link with the selected printer device;
send a print job to the selected printer device over the established direct communication link.

13. The wireless communication device of claim 12, wherein the processor is further configured with processor-executable instruction to establish the direct communication link by setting up a peer-to-peer connection between the wireless communication device and the selected printer device using a wireless direct communication selected from the group of Wi-Fi Direct, Wi-Fi Aware, Long Term Evolution (LTE) Direct, or 5G device-to-device.

14. The wireless communication device of claim 8, wherein the processor is further configured with processor-executable instruction such that the list of discovered printer devices includes, for each discovered printer device:
a device name, an internet protocol (IP) address, and an indication of a relative distance of the discovered printer device from the wireless communication device.

15. A non-transitory processor-readable storage medium having stored thereon processor-executable instructions configured to cause a processor of a wireless communication device to perform operations comprising:
detecting a mobile print service triggered on the wireless communication device;
scanning radio channels associated with Bluetooth Low Energy (BLE) advertisement broadcasts to monitor BLE advertising channels;

receiving BLE advertising packets from printer devices within range of the wireless communication device, the BLE advertising packets including:
- information identifying a printing capability of a printer device; and
- information indicating whether the printer device supports a wireless direct communication link;

requesting and receiving additional information that exceeds a byte capacity of a single one BLE advertising packet from one or more of the printer devices within range of the wireless communication device for one or more of the received BLE advertising packets by:
- sending a scan request message to the one or more of the printer devices; and
- receiving a scan response packet from the one or more of the printer devices on one or more of the BLE advertising channels; and displaying at least one printing capability, identified in the received BLE advertising packets or received additional information, as part of a list of discovered printer devices.

16. The non-transitory processor-readable storage medium of claim 15, wherein the stored processor-executable instructions are configured to cause the processor of a wireless communication device to perform operations further comprising:
- detecting a user input selecting a printer device from the list of discovered printer devices; and
- establishing a BLE connection with the selected printer device.

17. The non-transitory processor-readable storage medium of claim 16, wherein the stored processor-executable instructions are configured to cause the processor of a wireless communication device to perform operations further comprising:
- receiving information identifying a wireless local area network (WLAN) to which the selected printer device is connected, wherein the information is received over the BLE connection with the selected printer device.

18. The non-transitory processor-readable storage medium of claim 17, wherein the stored processor-executable instructions are configured to cause the processor of a wireless communication device to perform operations further comprising:
- determining whether the wireless communication device is connected to the identified WLAN;
- performing a handover to the identified WLAN in response to determining that the wireless communication device is not currently connected to the identified WLAN; and
- sending a print job to the selected printer device over the identified WLAN.

19. The non-transitory processor-readable storage medium of claim 16, wherein the stored processor-executable instructions are configured to cause the processor of a wireless communication device to perform operations further comprising:
- receiving information from the selected printer device to establish a direct communication link, wherein the information is received over the BLE connection;
- establishing the direct communication link with the selected printer device;
- sending a print job to the selected printer device over the established direct communication link.

20. The non-transitory processor-readable storage medium of claim 19, wherein the stored processor-executable instructions are configured to cause the processor of a wireless communication device to perform operations such that establishing the direct communication link comprises setting up a peer-to-peer connection between the wireless communication device and the selected printer device using a wireless direct communication selected from the group of Wi-Fi Direct, Wi-Fi Aware, LTE Direct, or 5G device-to-device.

21. The non-transitory processor-readable storage medium of claim 15, wherein the stored processor-executable instructions are configured to cause the processor of a wireless communication device to perform operations such that:
- a device name, an internet protocol (IP) address, and an indication of a relative distance of the discovered printer device from the wireless communication device.

22. A wireless communication device, comprising:
- means for detecting a mobile print service triggered on the wireless communication device;
- means for scanning radio channels associated with Bluetooth Low Energy (BLE) advertisement broadcasts to monitor BLE advertising channels;
- means for receiving BLE advertising packets from printer devices within range of the wireless communication device, the BLE advertising packets including:
  - information identifying a printing capability of a printer device; and
  - information indicating whether the printer device supports a wireless direct communication link; and
- means for requesting and receiving additional information that exceeds a byte capacity of a single BLE advertising packet from one or more of the printer devices within range of the wireless communication device for one or more of the received BLE advertising packets by:
  - sending a scan request message to the one or more of the printer devices; and
  - receiving a scan response packet from the one or more of the printer devices on one or more of the BLE advertising channels; and
- means for displaying at least one printing capability, identified in the received BLE advertising packets or received additional information, as part of a list of discovered printer devices.

* * * * *